United States Patent
Tibbits et al.

(10) Patent No.: US 10,330,851 B2
(45) Date of Patent: Jun. 25, 2019

(54) BACKLIGHT SYSTEMS CONTAINING DOWNCONVERSION FILM ELEMENTS

(71) Applicant: 3M INNOVATIVE PROPERTIES COMPANY, St. Paul, MN (US)

(72) Inventors: Joshua D. Tibbits, Eagan, MN (US); Yu Yang, Eden Prairie, MN (US); JianGang Su, Suzhou (CN); Feng Zhao, Shanghai (CN); Wenlong Yang, Jiangsu Province (CN); Shu-Ching Fan, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 127 days.

(21) Appl. No.: 15/505,397

(22) PCT Filed: Aug. 19, 2015

(86) PCT No.: PCT/US2015/045942
§ 371 (c)(1),
(2) Date: Feb. 21, 2017

(87) PCT Pub. No.: WO2016/028919
PCT Pub. Date: Feb. 25, 2016

(65) Prior Publication Data
US 2017/0242178 A1 Aug. 24, 2017

Related U.S. Application Data

(60) Provisional application No. 62/040,333, filed on Aug. 21, 2014.

(51) Int. Cl.
*F21V 8/00* (2006.01)
*G02F 1/1335* (2006.01)

(52) U.S. Cl.
CPC ........... *G02B 6/005* (2013.01); *G02B 6/0055* (2013.01); *G02B 6/0088* (2013.01); *G02F 1/133609* (2013.01); *G02F 2001/133614* (2013.01)

(58) Field of Classification Search
CPC .... G02B 6/005; G02B 6/0055; G02B 6/0088; G02F 1/133609; G02F 2001/133614
USPC ........................................................ 362/607
See application file for complete search history.

(56) References Cited

U.S. PATENT DOCUMENTS

| 8,647,727 B1 | 2/2014 | Barnidge |
| 2011/0298696 A1 | 12/2011 | Gu |
| 2012/0113672 A1 | 5/2012 | Dubrow |
| 2013/0335677 A1 | 12/2013 | You |
| 2014/0036492 A1 | 2/2014 | Simon |

(Continued)

FOREIGN PATENT DOCUMENTS

| JP | 2014-119642 | 6/2014 |
| WO | 2012-177793 | 12/2012 |
| WO | 2015-065601 | 5/2015 |

OTHER PUBLICATIONS

International Search Report for PCT International Application No. PCT/US2015/045942, dated Mar. 18, 2016, 4 pages.

*Primary Examiner* — Laura K Tso
(74) *Attorney, Agent, or Firm* — Lisa P. Fulton

(57) ABSTRACT

Methods for improving color uniformity across an LCD backlight unit having a viewable area, a downconversion film element and blue LEDS comprise increasing blue light absorption while reflecting red and green light in at least one edge of the viewable area.

21 Claims, 3 Drawing Sheets

(56) References Cited

U.S. PATENT DOCUMENTS

| | | | |
|---|---|---|---|
| 2015/0109814 A1* | 4/2015 | Chen | G02B 6/0073 |
| | | | 362/606 |
| 2015/0331170 A1* | 11/2015 | Cheng | G02B 6/0031 |
| | | | 362/607 |
| 2016/0033711 A1* | 2/2016 | Lee | G02F 1/133615 |
| | | | 362/607 |
| 2018/0046031 A1* | 2/2018 | Kamada | F21V 3/00 |
| 2018/0210129 A1* | 7/2018 | Uno | F21S 2/00 |

* cited by examiner

BACKLIGHT SYSTEMS CONTAINING DOWNCONVERSION FILM ELEMENTS

FIELD

This invention relates to methods of improving color uniformity in backlight systems containing a downconversion film element and to the improved backlight systems.

BACKGROUND

Liquid crystal displays (LCDs) are non-emissive displays that utilize a separate backlight unit and red, green and blue color filters for pixels to display a color image on a screen. The red, green and blue color filters respectively separate white light emitted from the backlight unit into red, green and blue lights. The range of colors that can be displayed by an LCD device is called color gamut.

LCD backlight systems typically include a film stack containing a reflector plate or film, a light guide (for example, a light guide plate or light guide film) containing extraction features, a diffusing sheet, light redirecting films (for example, prism films, lenticular films and/or other brightness enhancement films) and/or a reflective polarizer. Traditionally, LCDs have utilized white light-emitting diodes (LEDs) consisting of a blue LED die combined with a yellow YAG phosphor. Mobile/handheld devices are typically edge-lit and contain a light guide to uniformly distribute light over the display area. The "white" light is then diffused out of the light guide using a diffuser sheet. Recently, however, LCDs having improved color gamut been developed. In these LCDs, white LEDs are replaced with blue LEDs and the diffuser sheet is replaced with a downconversion film element that actively converts color. The downconversion sheet may comprise, for example, red and green quantum dots, phosphors, fluorescing dyes and the like. By simply replacing the bottom diffuser sheet in a typical LCD backlight with a quantum dot film element, the achieved color gamut can be increased dramatically (for example, by 50%).

One issue associated with backlight systems containing quantum dot film elements or other downconversion film elements is color non-uniformities near the boundaries of the backlight (that is, at the edges of the viewable area of the display). Typically, this non-uniformity manifests itself as a blue glow at the edge of the viewable area of the display. This glow is commonly thought to be the result of blue light leakage out of the edge of the backlight system.

SUMMARY

In view of the foregoing, we recognize that there is a need for improved color uniformity in backlight systems containing downconversion film elements.

Surprisingly, we have discovered that color non-uniformity at the edge of the viewable area of displays containing downconversion film elements is not attributable to blue light leakage alone as previously believed. Rather, we have discovered that the color non-uniformity is primarily caused by insufficient red and green light at the edge of the display due to the difference in the angular distribution of red and green light versus blue light. We have determined that using a material that reflects red and green light but that absorbs blue light at the edge of the viewable area of the display can balance the blue light with the red and green light and provide light with a white point closer to that of the center of the viewable area of the display.

Briefly, in one aspect, the invention provides LCD backlight units comprising (a) a support structure, (b) a downconversion film element and (c) blue LEDs; wherein the support structure comprises blue light absorber/red and green light reflector on at least its edge adjacent the downconversion film element.

In another aspect, the invention provides LCD backlight units comprising (a) a downconversion film element, (b) a light guide having at least one edge comprising blue light absorber/red and green light reflector and (c) blue LEDs.

In yet another aspect, the invention provides LCD backlight units comprising (a) a light redirecting film, (b) a downconversion film element, (c) blue LEDs and (d) blue light absorber/red and green light reflector; wherein the blue light absorber/red and green light reflector overlaps the edge of the light redirecting film or the edge of the downconversion film element.

In still another aspect, the invention provides methods of improving color uniformity across an LCD backlight unit having a viewable area. The method comprises increasing blue light absorption while reflecting red and green light in at least one edge of the viewable area; wherein the LCD backlight unit comprises a downconversion film element and blue LEDs.

As used herein, the term "blue light absorber/red and green light reflector" means a material that absorbs blue light but that reflects red light. For example, a blue light absorber/red and green light reflector may absorb some light of wavelengths between about 420 nm and about 500 nm but reflect some light of wavelengths between about 510 nm and 660 nm. Preferably, the blue light absorber/red and green light reflector is selected to substantially absorb the output wavelengths of the blue LEDs utilized in the backlight unit and to substantially reflect the output wavelengths of the red and green downconvertors (for example, red and green quantum dots).

BRIEF DESCRIPTION OF THE DRAWINGS

The invention may be more completely understood in consideration of the following detailed description in connection with the following figures.

DETAILED DESCRIPTION

Figure 1:
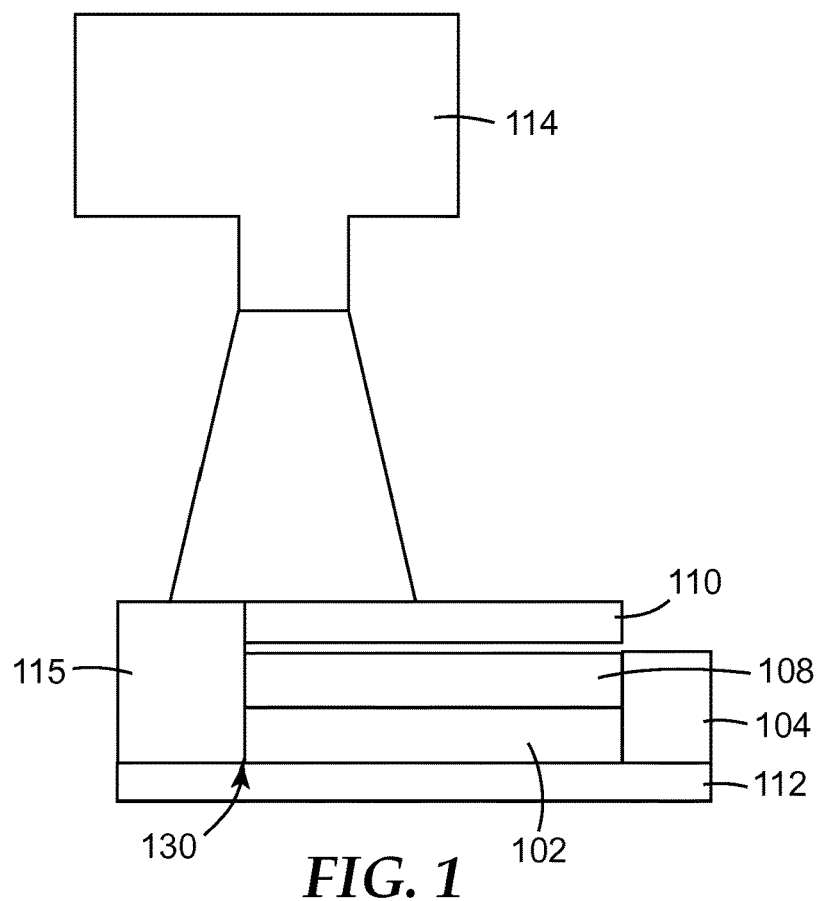
FIG. 1 is a diagram of a measurement set up utilized in the Examples.

In order to achieve a uniform white color across a display, a uniform mixture of red, green and blue needs to be maintained spatially. We have recognized that in backlights containing downconversion sheets such as quantum dot films, the mixture of red, green and blue is not spatially uniform primarily because the different colors of light come from different sources. The red and green light, for example, comes from the quantum dots. Photons are emitted by the quantum dots in all directions equally. The red and green light thus has a wide angular distribution. Blue light, on the other hand, comes from the blue LEDs. The blue light is not is not distributed in all directions equally. The angular distribution of the blue light is largely determined by the optical film stack (for example, the light guide, diffuser and/or light redirecting films, etc.) in the backlight system. The blue light thus typically has less spread as compared to red and green light.

A result of the wide angular distribution of the red and green light is that the color at any one point is not only determined by the light coming from the area directly under that point, but also by the light coming from adjacent areas. Red and green light is thus more dependent on the light emitted by adjacent areas than the blue light because of its wider angular distribution.

In edge-lit LCD backlight systems, a light guide with extraction features is typically used to provide more uniform light to the display. The extraction features typically vary in density over the viewable display area to achieve a uniform appearance. For example, there are typically few extraction features near the LEDs and an increasing density of extraction features as you move away from the LEDs. It is common practice to end the extraction features close to the edge of the viewable area of the LCD panel. We have discovered that in edge-lit backlight systems containing downconversion film elements (for example, quantum dot films), ending the extraction features at the edge of the viewable area results in more blue color at the edge of the viewable area because there is not enough red and green light available at the edge to mix with the blue light and produce white light. That is, very little red and green light is being generated outside the area containing the extraction features.

Furthermore, we have recognized that the red and green light that is emitted from the quantum dot film at the edge of display is not sufficient to produce uniform color because more red and green light is lost out the edge of the display than blue light due to the difference in angular distribution.

To improve color uniformity near the edge of the display area, we have discovered that it is necessary to either make-up for the "missing" red and green light at the display edge or remove excess blue light. WO publication 2015/065601, incorporated herein by reference, describes methods for increasing red and green light at the display edge. Decreasing blue light at the edge of the display can be accomplished using blue light absorber/red and green light reflectors. In some backlight units, it may be advantageous to combine the methods described in WO 2015/065601 with the methods described below.

One way to use blue light absorber/red and green light reflectors to improve color uniformity near the edge of the visible area of a display is to add a blue light absorber/red and green light reflector to the backlight mechanical support structure (for example, the frame) or to construct the frame of a blue light absorbing material. For example, blue light absorber/red and green light reflector can be added to the support structure on at least the edge of the support that is adjacent the downconversion film element. The blue light absorber/red and green light reflector can comprise, for example, a yellow pigment. Examples of suitable blue light absorber/red and green light reflectors include yellow coatings, paints, inks, films and tape. Alternatively, the mechanical support structure can be constructed of a blue light absorbing material such as, for example, a yellow plastic.

Multilayer optical film (MOF) tuned to reflect only red and green light that are combined with a blue light absorber can also be used as a blue light absorber/red and green light reflector. For example, the MOF could be attached to a dark colored (for example, black) frame or have a dark colored (for example, black) material applied (for example, laminated or coated) to its backside.

Another way to use blue light absorber/red and green light reflector to improve color uniformity near the edge of the visible area of a display is to add blue light absorber/red and green light reflector such as those described above to the edge(s) of the light guide. The blue light absorber/red and green light reflector can be applied at the top, the sides, a combination of the top and sides or all around the edges of the light guide. For example, yellow paint or ink can be painted or printed around the edges of the light guide.

Still another way to use blue light absorber/red and green light reflector to improve color uniformity near the edge of the visible area of a display is to add blue light absorber/red and green light reflector such as those described above to the edge of the light redirecting film or the edge of the downconversion film element. The blue light absorber/red and green light reflector can be applied at the top, the sides, a combination of the top and sides or all around the edges of the downconversion film element or the light guide. For example, yellow paint or ink can be painted or printed around or yellow tape can be adhered around the edges of the light redirecting film or the downconversion film element. The amount of overlap of the yellow tape on the light redirecting film or the downconversion film element that is necessary will vary with the absorption properties of the material. In general, the more blue light absorbing the material, the less overlap required. One of skill in the art will appreciate how to use the absorption properties and the overlap to fine tune the output color from the display near the edges.

Suitable down converting materials can include red and green quantum dots, phosphors, fluorescing dyes or the like. The down converting material can be the same material as the downconversion film element.

EXAMPLES

Objects and advantages of this invention are further illustrated by the following examples, but the particular materials and amounts thereof recited in these examples, as well as other conditions and details, should not be construed to unduly limit this invention.

Comparative Example 1 and Example 1

Figure 2A:
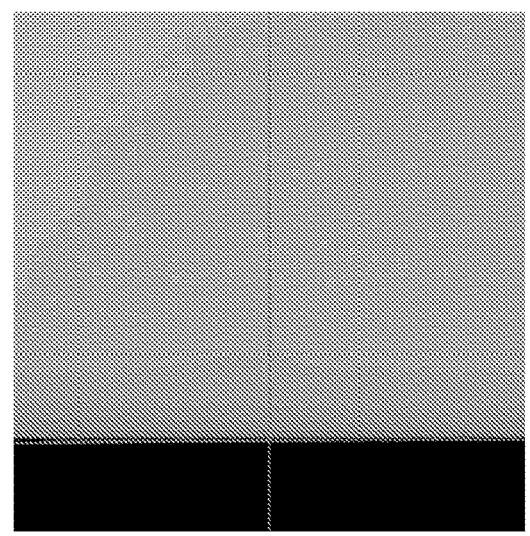
FIG. 2a is a camera image from the set up shown in FIG. 1.
Figure 2B:
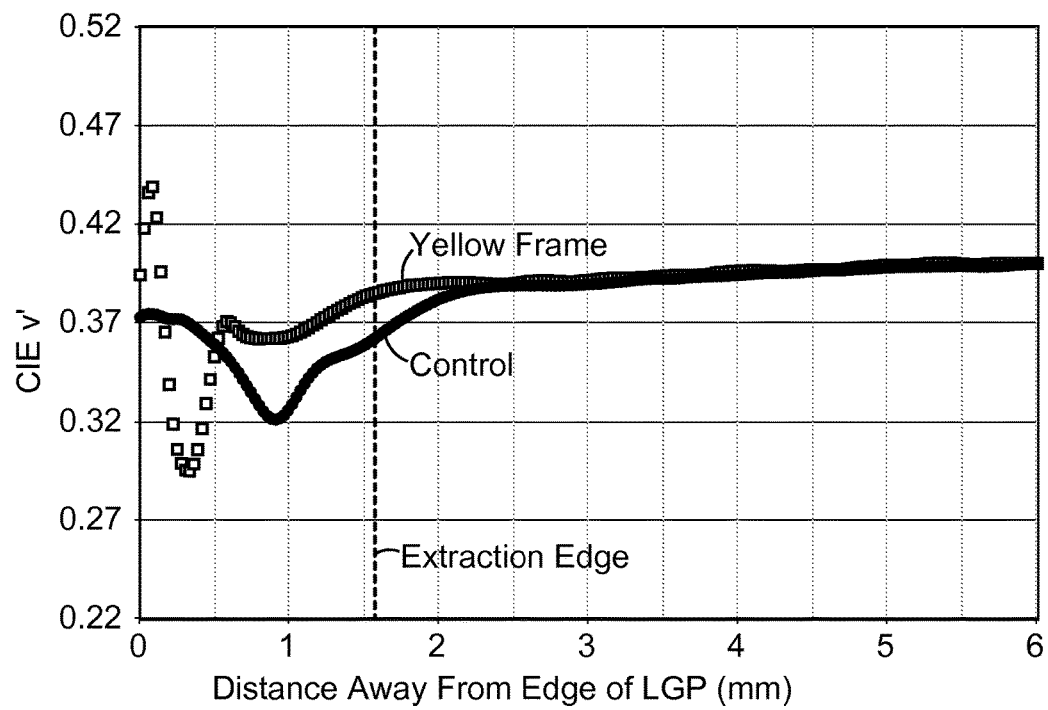
FIG. 2b is measurement data from the set up shown in FIG. 1.

As shown in FIG. 1, a light guide plate from a notebook PC backlight was lit by blue LEDs 104 and placed on a sheet of ESR 112. 3M™ QDEF-210 (Quantum dot enhancement film from 3M Company) 108 and crossed prisms film (BEF4-GT and BEF4-GMv5 available from 3M Company) 110 were placed on top of light guide plate 102 and ESR 112. Mechanical support structure 115 formed a border of the film stack. For example 1, yellow marker 130 was applied to the edge of support structure 115 on the edge adjacent the QDEF 108. No marker was applied for Comparative Example 1. A Prometric camera (Radiant Imaging PM Series Imaging Colorimeter PM-9913E-1) 114 was positioned above the stacked films and used to measure spatial color over the area shown in FIG. 1. The output from these examples is shown in FIGS. 2a and 2b. FIG. 2a is an image from the camera. FIG. 2b contains cross section color data along the center line of FIG. 2a Comparative Example and Example 2

Figure 3:
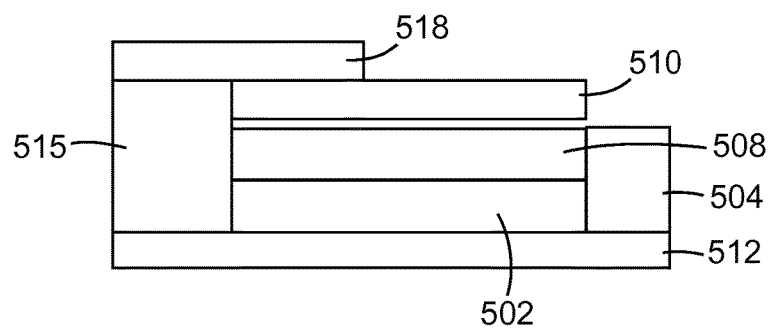
FIG. 3 is a diagram of a measurement set up utilized in the Examples.
Figure 4A:
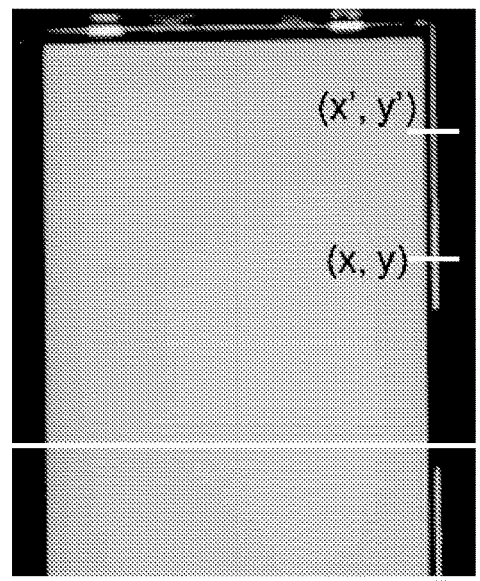
FIG. 4a is a camera image from the set up shown in FIG. 3.
Figure 4B:
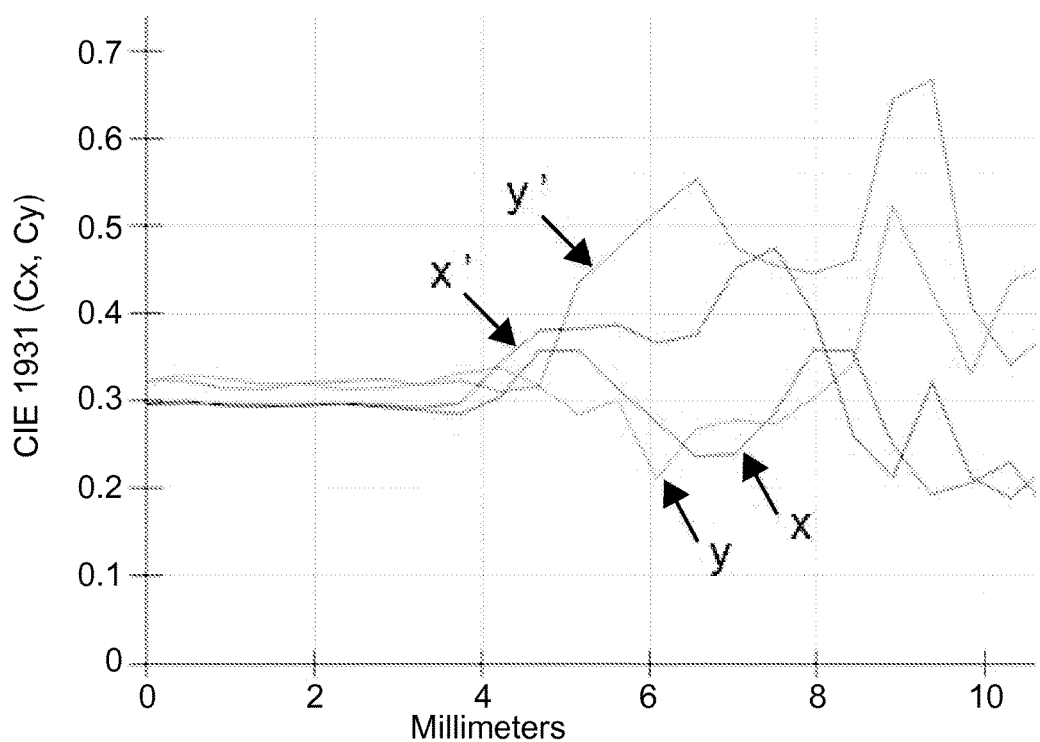
FIG. 4b is measurement data from the set up shown in FIG. 3.

As shown in FIG. 3, a light guide plate from a Kindle Fire HDX 502 was lit by blue LEDs 504 and placed on a sheet of ESR 512. 3M™ QDEF-210 508 and crossed prisms film (BEF4-GT and BEF4-GMv5) 510 were placed on top of light guide plate 502 and ESR 512. Mechanical support structure 515 formed a border of the film stack. For Example 2, yellow rim tape 518 was applied overlapping the edge of crossed prism films 510. A PR-650 spectraphotometer was positioned above the stacked films and used to measure spatial color and luminance over the area at the edge where yellow rim tape 518 was located (Example 2) and where there was no yellow rim tape (Comparative Example). The output from these examples is shown in FIGS. 4a and 4b. FIG. 4a is an image from the camera. FIG. 4b contains cross section color data along the line at x, y for the unmodified mechanical support (Comparative Example) and along line at x', y' for the yellow painted mechanical support (Example 2).

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An LCD backlight unit comprising:
   (a) a downconversion film element;
   (b) a light guide adjacent a major surface of the downconversion film;
   (c) a support structure adjacent an edge of the downconversion film element and
   (d) blue LEDs positioned to introduce light into the light guide;
   wherein the support structure comprises a material that absorbs blue light and reflects red and green light on at least its edge adjacent the downconversion film element, wherein the material is selected from the group consisting of yellow plastic, yellow coating, yellow paint, yellow ink, yellow film, yellow tape and multilayer optical film tuned to reflect only red and green light combined with a blue light absorber.

2. The backlight unit of claim 1 wherein the support structure comprises yellow plastic.

3. The backlight unit of claim 1 wherein the material is yellow coating, paint or ink.

4. The backlight unit of claim 1 wherein the material is a yellow film or tape.

5. The backlight unit of claim 1 wherein the material is a multilayer optical film tuned to reflect only red and green light combined with a blue light absorber.

6. The backlight unit of claim 1 wherein the downconversion film element is a quantum dot film.

7. The backlight unit of claim 1 wherein the backlight unit is edge-lit.

8. A method of improving color uniformity across an LCD backlight unit having a viewable area comprising:
   providing an LCD backlight unit comprising a downconversion film element, a light guide adjacent a major surface of the downconversion film and blue LEDs positioned to introduce light into the light guide, and
   increasing blue light absorption while reflecting red and green light in at least one edge of the viewable area.

9. The method of claim 8 wherein the LCD backlight unit further comprises a support structure adjacent an edge of the downconversion film element and increasing blue light absorption while reflecting red and green light in at least one edge of the viewable area comprises applying a material that absorbs blue light and reflects red and green light to an edge of the support structure adjacent the downconversion film element.

10. The method of claim 8 wherein increasing blue light absorption while reflecting red and green light in at least one edge of the viewable area comprises applying a material that absorbs blue light and reflects red and green light to at least one edge of the light guide.

11. The method of claim 8 wherein the LCD backlight unit further comprises a light redirecting film and increasing blue light absorption while reflecting red and green light in at least one edge of the viewable area comprises applying a material that absorbs blue light and reflects red and green light overlapping the edge of the light redirecting film or the edge of the downconversion film element.

12. The method of claim 9 wherein the material is yellow coating, paint or ink.

13. The method of claim 10 wherein the material is yellow coating, paint or ink.

14. The method of claim 11 wherein the material is yellow coating, paint or ink.

15. The method of claim 9 wherein the material is yellow film or tape.

16. The method of claim 10 wherein the material is yellow film or tape.

17. The method of claim 11 wherein the material is yellow film or tape.

18. The method of claim 9 wherein the material is a multilayer optical film tuned to reflect only red and green light combined with a blue light absorber.

19. The method of claim 10 wherein the material is a multilayer optical film tuned to reflect only red and green light combined with a blue light absorber.

20. The method of claim 11 wherein the material is a multilayer optical film tuned to reflect only red and green light combined with a blue light absorber.

21. The method of claim 8 wherein the downconversion film element is a quantum dot film.

* * * * *